(12) United States Patent
Rekimoto

(10) Patent No.: US 6,965,842 B2
(45) Date of Patent: Nov. 15, 2005

(54) USER INPUT APPARATUS

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 10/479,135

(22) PCT Filed: May 30, 2002

(86) PCT No.: PCT/JP02/05257

§ 371 (c)(1),
(2), (4) Date: Nov. 26, 2003

(87) PCT Pub. No.: WO02/099614

PCT Pub. Date: Dec. 12, 2002

(65) Prior Publication Data

US 2004/0243342 A1    Dec. 2, 2004

(30) Foreign Application Priority Data

Jun. 1, 2001 (JP) .............................. 2001-167249

(51) Int. Cl.[7] .............................................. G06F 15/00
(52) U.S. Cl. .................................................... 702/150
(58) Field of Search .......................... 702/94, 95, 104, 702/150–153, 155, 158; 73/510, 865.4, 865.7

(56) References Cited

U.S. PATENT DOCUMENTS 4,414,537 A * 11/1983 Grimes ........................ 341/20
5,714,698 A    2/1998 Tokioka et al. ............. 73/865.4
6,223,018 B1 * 4/2001 Fukumoto et al. .......... 455/41.1

FOREIGN PATENT DOCUMENTS

| DE | 695 21 819 | 8/1995 |
| EP | 0 666 544 | 8/1995 |
| EP | 0 816 986 | 1/1998 |
| JP | 7-219703 | 8/1995 |
| JP | 10-113343 | 5/1998 |
| JP | 11-143608 | 5/1999 |
| JP | 2000-187553 | 7/2000 |
| JP | 2000-221953 | 8/2000 |
| JP | 2000-321013 | 11/2000 |

OTHER PUBLICATIONS

Translation of JP 11-143608, May 28, 1999.*

* cited by examiner

Primary Examiner—Michael Nghiem
(74) Attorney, Agent, or Firm—Frommer Lawrence & Haug LLP; William S. Frommer

(57) ABSTRACT

A user input apparatus according to the present invention is configured like a wrist watch and a system can recognize the gesture such as "grip" and "release" or the like and can input the gesture as a command merely by attaching the user input apparatus to user's wrist. Further, by adding an acceleration sensor or the like for measuring the movement of an arm itself to a bracelet, the user input apparatus can be configured so as to input more complicated instruction and command. The user input apparatus can be used as an input apparatus for a wearable computer (or wearable computer), or a controller to input a command for a game machine or the like.

6 Claims, 5 Drawing Sheets

F I G. 1
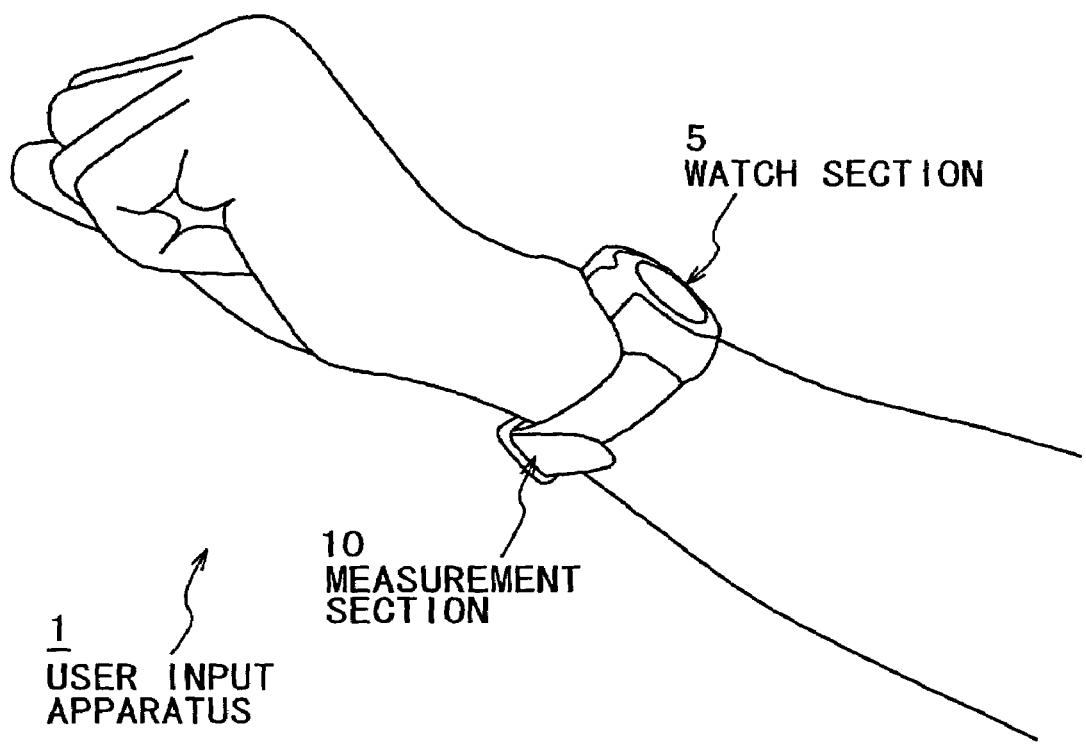

F I G. 4
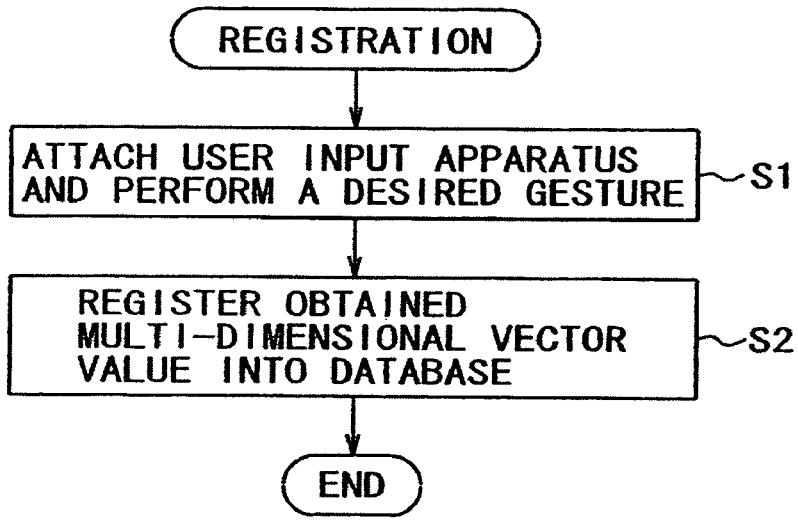
F I G. 5
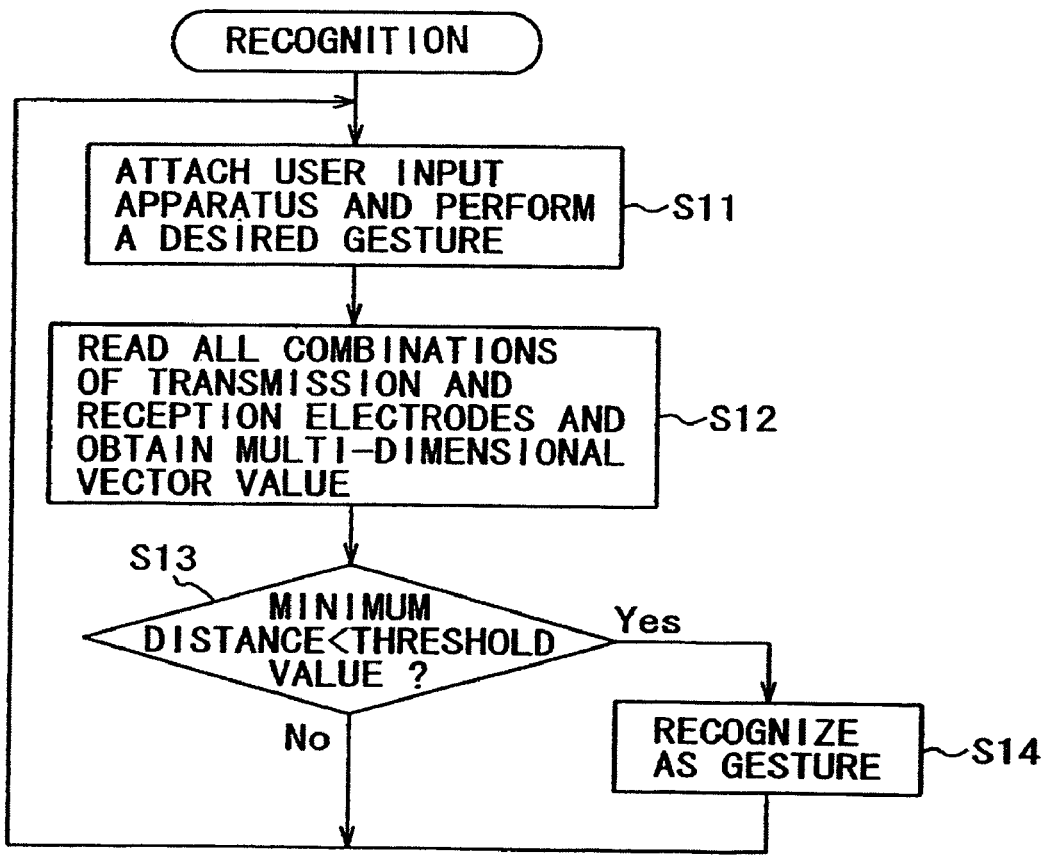

FIG. 6
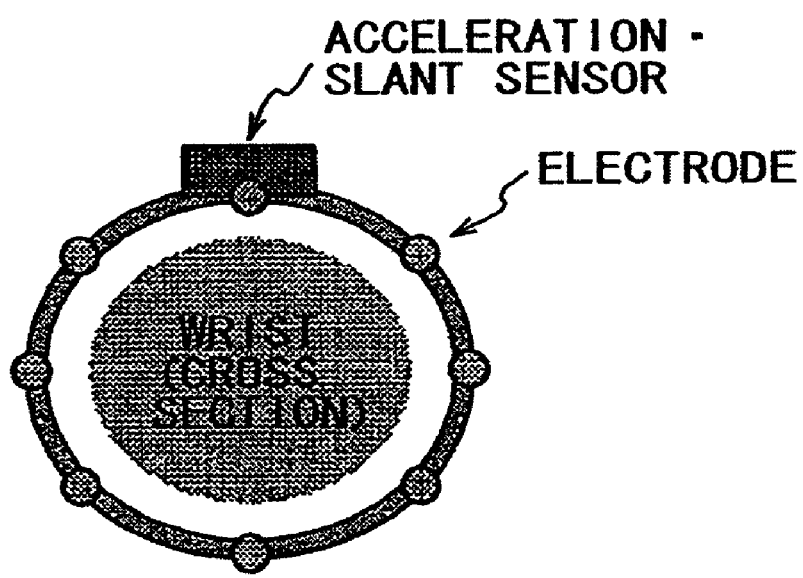
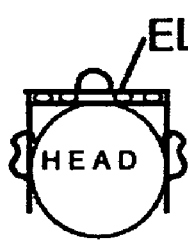
FIG. 7    FIG. 8

USER INPUT APPARATUS

TECHNICAL FIELD

The present invention relates to a user input apparatus, with which a user inputs a command and data or the like into a computer, and specifically, relates to a user input apparatus, with which the user carries out the input operation by using a portion of a human body.

More particularly, the present invention relates to a user input apparatus, which is used by attaching to the human body and precisely carries out the input operation in accordance with the user's intention, and specifically, relates to a user input apparatus, which recognizes a gesture presented by the user and captures it therein as the user input.

BACKGROUND ART

In accordance with recent technical innovation, a computer system of a versatile type called as a work station (WS) and a personal computer (PC), which is comparatively compact and low-cost and is highly value added and highly functional, has been developed and put on sale. This type computer system has been deeply prevalent in a university and the other research institutes, a business enterprise and the other offices, and further, a daily life of a family. Now, a most part of a daily work is related with a computer and many people spend the entire day touching a key board and a mouse.

The computer system is generally driven in response to a user input command and by displaying a processing result on a displayed screen, thereby offering an "interactive", namely, a dialogical processing environment. Recently, the computer system is transitional from a conventional character based user input environment via a key board that is representative of a DOS (Disk Operating System) shell screen, namely, "a CUI (Character User Interface)" into a "GUI (Graphical User Interface)" realizing a graphic based user input. Under the GUI environment, a desktop in which the computer system is simulated and many icons are prepared on a display screen.

On the desktop that is offered within the GUI, all resources such as a file or the like to be handled in the computer system are presented as an icon. The user is capable of operating a computer intuitively and in an easily comprehensible manner by directly applying the behavior (for example, click and drug and drop) to a display object on a screen such as an icon symbolizing a program, data, a folder and a device or the like on a display screen by means of the user input apparatus such as a mouse or the like. In addition, a button for calling up various functions, namely, the computer processing in a moment of time such as a menu bar and a tool box or the like is prepared, so that a manner of a command input into the computer is becoming increasingly intuitive and easily-comprehensible.

As a result of introduction of the GUI environment, by now, the user can sufficiently operate the computer even if the user does not master a name and a command operation method or the like of a specific command and does not perform a troublesome key input. In addition, the computer can precisely capture the user input in accordance with the user's intension into the system.

On the other hand, in the daily life, a person often presents a gesture such as "body gesture" and "hand gesture", with which his or her own feeling and intention are reflected. Such a gesture is one pattern of a message from another person, however, it can be also grasped as a command to be presented toward outside world.

For example, if an input apparatus such as a wrist watch or the like is provided, which the user can wear without uncomfortable feeling and which can recognize user's gesture such as "grip", "release" or the like, the user will be able to freely input various commands into the computer merely by wearing this while walking around.

Conventionally, there is a technology to recognize displacement of a muscle by measuring electromyogram (EMG). Further, some propose to use the electromyogram as a input means for a computer.

However, in the case that the electromyogram of a human body is regarded as a measuring object, an electrode should be made directly contact with a skin of the user, and this results in imposing discomfort and physical and mental strain to the user. In addition, the electrodes should be attached at separate positions on the muscle (for example, in the vicinities of the opposite ends of an upper arm) based on its measurement principle. However, in such a case, it becomes troublesome to attach this input apparatus to the human body and it becomes difficult to compose the input apparatus in a natural manner such as a wrist watch.

DISCLOSURE OF THE INVENTION

An object of the present invention is to provide an excellent user input apparatus, with which a user is capable of carrying out an input operation by using a part of his or her body.

A further object of the present invention is to provide an excellent user input apparatus, which is used by attaching it to a human body and is capable of precisely carrying out the input operation in accordance with the user's intension.

A still further object of the present invention is to provide an excellent user input apparatus, which recognizes gestures presented, by a user and may capture them therein as a user's input.

A still further object of the present invention is to provide an excellent user input apparatus, which is complicated to be attached to the human body and is composed in a natural manner such as a wrist watch.

The present invention is made in consideration of the above-described objects, and its first aspect is a user input apparatus to be used by attaching to a human body, including a plurality of transmission electrodes; a plurality of reception electrodes; a human body attaching means for attaching the above-described transmission electrodes and reception electrodes alternately along a surface of the human body; a signal generator for supplying a waveform signal of a predetermined frequency to each of the above-described transmission electrodes; and a receiver for receiving a waveform signal to be received at each of the above-described reception electrodes. Further, between the adjoining transmission electrode and reception electrode and the surface of the human body, a circuit that is equivalent to a capacitor is formed.

In the user input apparatus having such a configuration, in accordance with deformation of the surface of the human body due to the gestures presented by the user, a static capacity of each capacitor that is formed between the adjoining transmission electrode and reception electrode and the surface of the human body is changed.

Accordingly, by using the changes in the static capacity of the capacitor that is formed between the adjoining transmission electrode and reception electrode and the surface of the human body, it is possible to measure the gestures presented by the user in term of a multi-dimensional vector value that is measured between each transmission electrode, each reception electrode and the human body.

The user input apparatus may be further provided with gesture registration means for registering a gesture as the multi-dimensional vector value that is measured between each transmission electrode, each reception electrode and the human body, and a gesture recognition means for recognizing the gesture presented by the user on the basis of the registered gesture. This gesture recognition means may recognize and identify the gesture by comparing and checking the multi-dimensional vector value that is measured when the user presents the gesture with the multi-dimensional vector value that is registered in the above-described gesture registration means in advance.

In this case, the above-described human body attaching means may be configured like a bracelet capable of being attached to a wrist of the user. In such a case, when the user presents the gesture such as "grip", "release" or the like, it is possible to recognize and identify the gesture on the basis of an amount of deformation on the surface of the wrist.

It is a matter of course that the user may freely input various commands into the computer by merely wearing this while getting away from the computer main body such as a keyboard and walking around.

In addition, the user input apparatus may have a sensor mounted thereon, the sensor being such as an acceleration sensor or a slant sensor or the like for measuring movement characteristics of the human body itself. In such a case, it becomes possible to simultaneously measure the gestures presented by the user such as "grip" and "release" or the like and the movement of the arm itself (twist, shake) or the like. Accordingly, the user input apparatus may compose a more complex instruction by a compositive gesture in which a posture presented by the gesture and its movement characteristic are combined.

Alternatively, above-mentioned human body attaching means may be configured like a wearable shoe sole following a form of a foot sole of the user. In such a case, by alternately arranging the transmission and reception electrodes so as to be arrayed along the sole shoe or a road surface on which the user lands on his or her feet, it is possible to recognize walking and shifting of balance or the like.

Alternatively, the above-described human body attaching means may be formed like a frame of eye glasses capable of being attached on a face of the user. In such a case, by alternately arranging the transmission and reception electrodes so as to be arrayed along the frame of the eyeglasses, it is possible to recognize deformation of the face (particularly, change of the expression made by an eyelid and a periphery of an eye).

Further other object, characteristic and advantage of the present invention will be obvious from the detailed explanation on the basis of the embodiments according to the present invention to be described later and the attached drawings.

BRIEF DESCRIPTION OF DRAWINGS

FIG. 1 is a view depicting a manner that a user input apparatus 1 according to an embodiment of the present invention is attached to a human body of a user.

FIG. 4 is a flow chart showing a processing procedure for registering a gesture as the other-dimensional vector on the user input apparatus 1.

FIG. 5 is a flow chart showing a processing procedure for recognizing the gesture that is inputted on the user input apparatus 1.

FIG. 6 is a view showing a modified example of the present invention, in which, a sensor such as an acceleration sensor or a slant sensor or the like for measuring a movement of a wrist itself is further mounted on the user input apparatus 1.

FIG. 7 illustrates the user input apparatus configured as an eyeglass frame.

FIG. 8 illustrates the user input apparatus configured as a shoe sole.

BEST MODE FOR CARRYING OUT THE INVENTION

Figure 2:
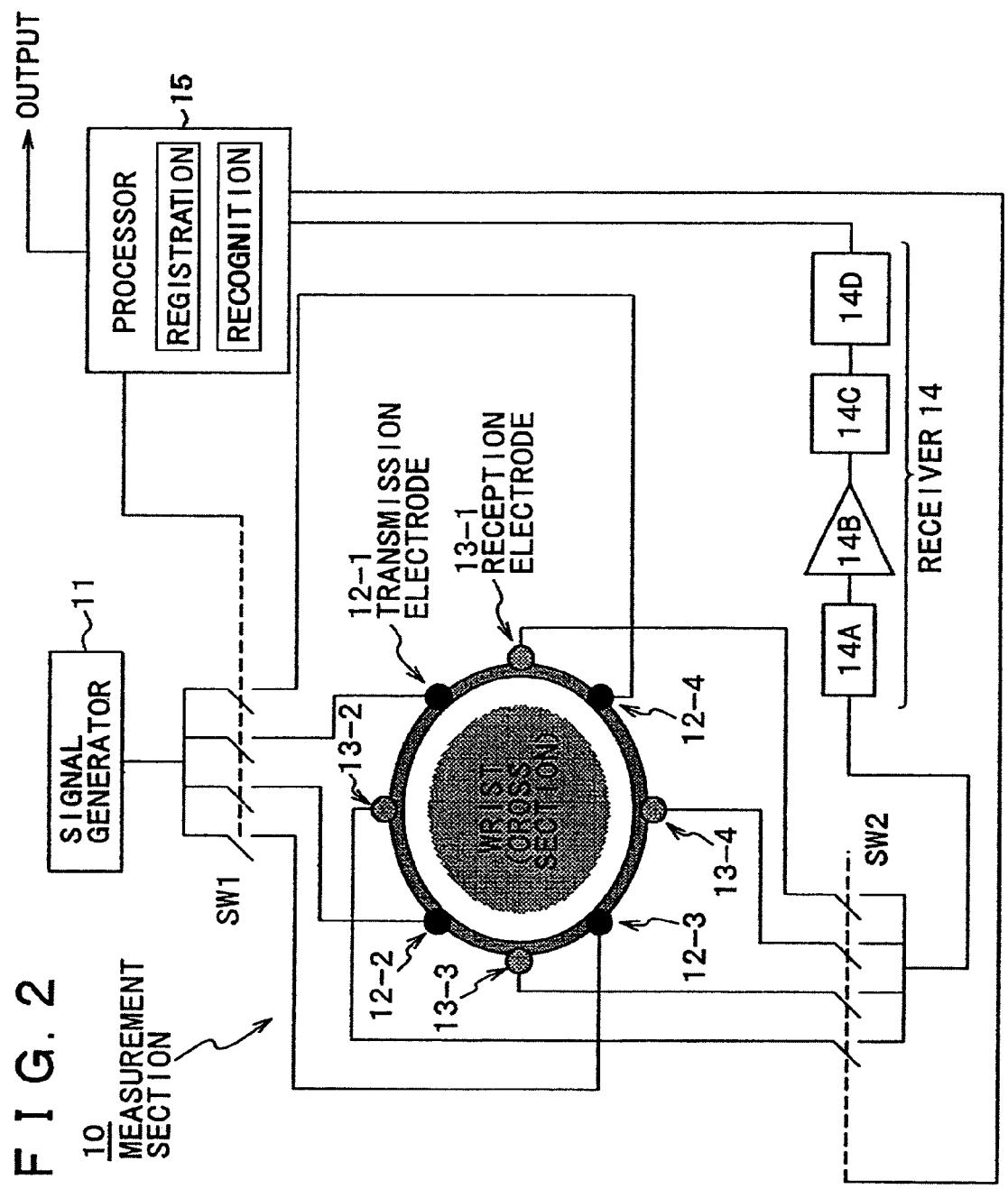
FIG. 2 is a view schematically illustrating a measurement section 10 and a configuration of a processing section for processing a detection signal in the measurement section 10.
Figure 3:
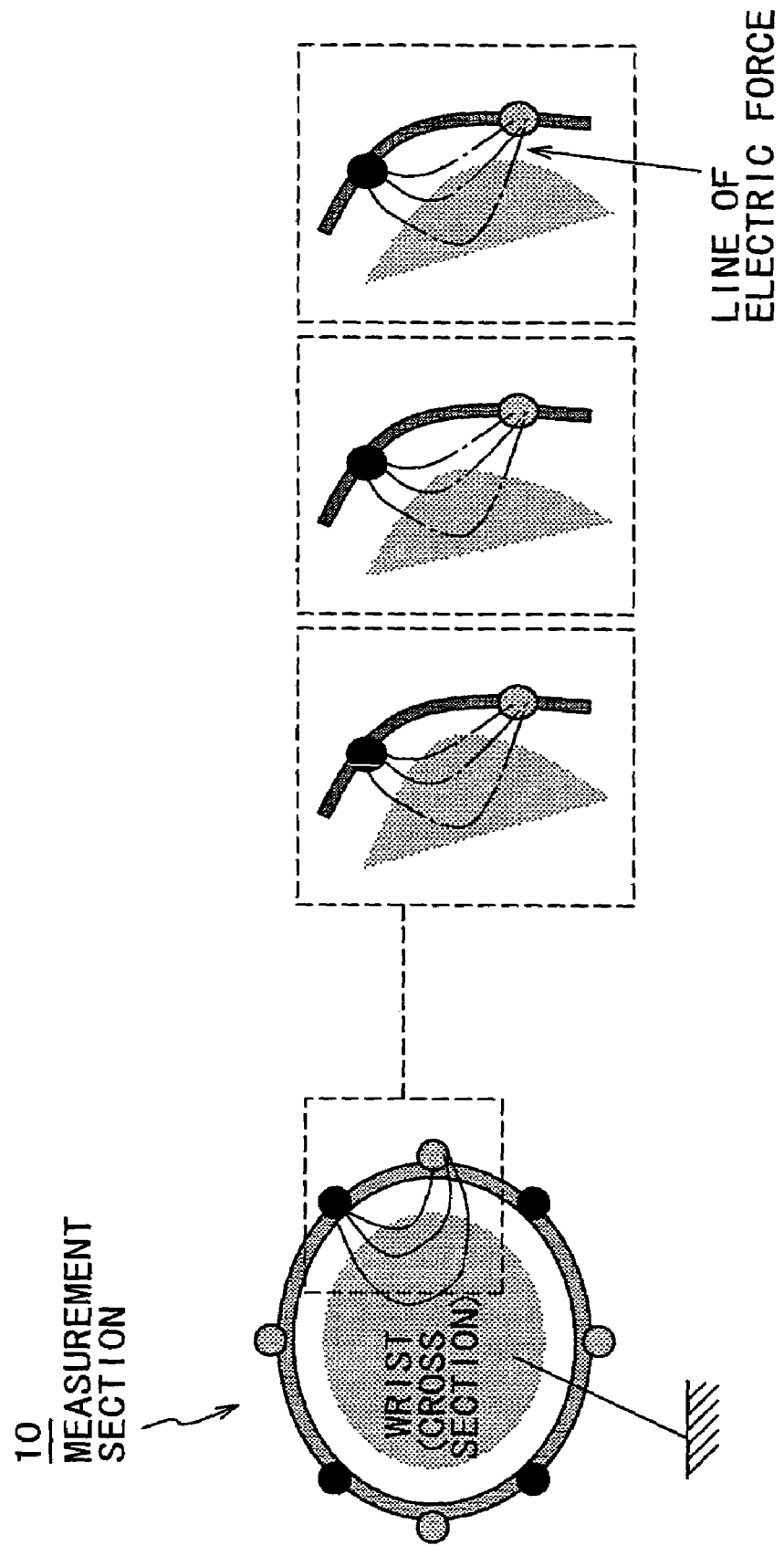
FIG. 3 is a view depicting a manner that a human body (a wrist) intervenes between a transmission electrode 12 and a reception electrode 13.

With reference to the drawings, the embodiments according to the present invention will be described in detail.

FIG. 1 depicts a manner that a user input apparatus 1 according to an embodiment of the present invention is attached to a human body of a user.

As shown in this drawing, a user input apparatus 1 according to the present embodiment has a configuration as same as a wrist watch. The user may naturally wear such a user input apparatus 1 without being conscious of wearing the user input apparatus 1 (or, without feeling physical and mental discomfort by wearing it).

According to the example shown in the drawing, the user input apparatus 1 is configured as an integral part including the wrist watch body, and it consists of a watch section 5 and a measurement section 10 that is like a belt winding this watch section 5 around a wrist of the user and measuring movement of the wrist.

The watch section 5 consists of a display section in which scale indexes are arranged in a circular ring shape and a hour hand, a minute hand, and a second hand that are rotating on this display section at respective speeds in accordance with time lapse. However, a function of the watch itself is not described here any more since it is not directly related to subject matter of the present invention.

On the other hand, on the measurement section 10, along a circumferential direction of the wrist, transmission electrodes for transmitting a transmission signal and reception electrodes for receiving the transmission signal are alternately arranged, and on the basis of the intensity of a reception signal at each reception electrode, it is possible to recognize if the user presents a gesture such as "grip" and "release" or the like.

FIG. 2 schematically illustrates the measurement section 10 and a configuration of a processing section for processing a detection signal in the measurement section 10.

As shown in this drawing, the measurement section 10 is configured from a plurality of transmission electrodes 12-1, 12-2, . . . that is arranged along a circumferential direction of a wrist, a signal generator 11 for supplying alternating current of a predetermined frequency (for example, 100 KHz) for transmission to each of transmission electrodes 12-1 . . . , a plurality of reception electrodes 13-1, 13-2, . . . that is inserted between transmission electrodes 12-1, . . . and receives alternating current from each of transmission electrodes 12-1 . . . by capacitively coupling in accordance with a static capacity between the electrodes, and a receiver 16 for carrying out signal processing such as AM modulation and A/D conversion with respect to the alternating current flowing through each of reception electrodes 13-1 . . . .

The receiver 14 consists of an AM modulator made of a band pass filter (BPF) 14A allowing the alternating current only at a predetermined frequency band to pass therethrough, an amplifier 14B and a detector 14C, and an A/D converter 14D for converting a detected output into a signal of a digital format. The digitally-converted detected signal is signal-processed by a processor 15, and then, it is outputted to the outside, namely, a computer (not illustrated) or the like, for example, as a predetermined user input signal.

As shown in FIG. 1 and FIG. 2, the user uses the user input apparatus 1, which is like a bracelet and on which the transmission electrodes 12 and the reception electrodes 13 are alternately arranged, while wearing it to his or her wrist.

From the signal generator 11, a waveform signal having a specific frequency (for example, 100 KHz) is generated. A SW1 consists of a plurality of analog switches and if one analog switch is turned on, the SW1 will supply the waveform signal to the corresponding transmission electrode 12 disposed on the bracelet. The open and close operation of each analog switch of the SW1 is sequentially controlled at predetermined timing by the processor 15. More specifically, the switch is scanned so that the waveform signal flows through only one transmission electrode 12 at a certain point of time.

In addition, on the bracelet, a plurality of reception electrodes 13-1, 13-2 . . . is arranged so as to be alternately disposed with each of transmission electrodes 12-1, 12-2, . . . .

Now, if a combination of one transmission electrode 12 and one reception electrode 13 is considered, a circuit that is equivalent to a capacitor is formed between the transmission and reception electrodes. Accordingly, by supplying a waveform signal of a predetermined frequency from the signal generator 11, an electric field that is generated by the transmission electrode 12 is received at the side of the reception electrode 13 due to the capacitive coupling in accordance with a static capacity.

In addition, between the transmission electrode 12 and the reception electrode 13, as shown in FIG. 13, a human body (a wrist) intervenes. Since the human body is regarded as a ground that is virtually grounded, the shift of an electric charge to be created by an electric field that is generated from the transmission electrode will flow through an earth via the wrist. This shift of the electric charge depends on a positional relation between the electrode and the wrist. For example, by the behavior of gripping a hand or releasing a hand or the like, a shape of the wrist may delicately change. In accordance with such change of the wrist shape, the static capacity of the capacitor to be created between the transmission electrode 12 and the reception electrode 13 will change.

A SW 2 consists of a plurality of analog switches and respective analog switches connect the corresponding reception electrodes 13-1, 13-2, . . . to the receiver 14. A result of A/D conversion of the reception signal is read by the processor 15 via the band pass filter (BPF) 14A that is set at the same value as the transmission frequency, the amplifier 14B and a detector 14C.

The open and close operation of each analog switch configuring the SW2 is sequentially switch-controlled at predetermined timing. More specifically, the switch is scanned so that the reception signal due to only one reception electrode 13 is read by the receiver 14 at a certain point of time.

Due to a combination of the open and close operations at each of the SW1 at the side of the transmission electrodes 12-1 . . . and the SW2 at the side of the reception electrodes 13-1 . . . , at a certain instance, only a combination of one transmission electrode and one reception electrode is connected. The processor 15 may obtain a value that is A/D converted with respect to the all combinations of the transmission and reception electrodes (4×4=16 combinations according to an example shown in FIG. 2) at a predetermined period by sequentially changing these SW1 and SW2 at predetermined timing. As a result of this, the user input apparatus 1 may obtain a value of 16 dimensions from the wrist of the user in real time manner.

In order for the user input apparatus 1 to recognize the gesture in practice, at first, the user performs a gesture like "grip" or "release" or the like several times with the user input apparatus 1 attached to the wrist, and then, the user records the combinations of the measured multi-dimensional vectors. In other words, the user carries out the operation for registering gestures that are desired to be used in future. Then, upon the user's input, comparing and checking the vector value that is obtained from the user input apparatus 1 with each of these recorded vector values, the gesture is recognized on the basis of distances between them.

FIG. 4 shows a processing procedure for registering a gesture as the other-dimensional vector on the user input apparatus 1 in a format of a flow chart.

In this case, the user performs a desired gesture with the user input apparatus 1 of a wrist watch type attached to the wrist of the user himself or herself (step S1).

Then, at the side of the user input apparatus 1, with respect to the all combinations of the transmission and reception electrodes, a reading processing is carried out to record a detected multi-dimensional vector value into the database (step S2). During the registration onto the database, a meaning to be assigned to the gesture (for example, a command to the computer and a specific data value) may be recorded together.

In addition, FIG. 5 shows a processing procedure for recognizing a gesture that is inputted by the user input apparatus 1 in a format of a flow chart.

At first, the user presents a desired gesture with the user input apparatus 1 attached to the user's hand (step S11).

At the side of the user input apparatus 1, with respect to the all combinations of the transmission and reception electrodes, the reading processing is carried out (step S12).

Then, the user input apparatus 1 calculates distances between a detected multi-dimensional vector value and each of the vector values that have been already registered into the database, and then, the user input apparatus 1 selects the multi-dimensional vector value of the minimum distance (step S13).

If the calculated minimum distance is less than a predetermined threshold value, it is recognized that the gesture having the vector value of the minimum distance is inputted (step S14). The recognition result that is obtained in this way is outputted to outside or a connected device such as a computer or the like.

In addition, in the case that the meaning assigned to the gesture (a specific command and a specific data value) is registered into the database, this may be outputted to the outside as the user input result.

An embodiment (refer to FIG. 6) such that a sensor such as an acceleration sensor or a slant sensor or the like for measuring the movement characteristic of the wrist itself may be further mounted on the bracelet of the user input apparatus 1 as shown in FIG. 2 may be also considered.

According to such a configuration of the apparatus, it is possible to simultaneously measure the gestures presented by the user, such as "grip" and "release" or the like, and the movement of the arm itself (twist, shake) or the like. Accordingly, the user input apparatus 1 may configure a more complex instruction with a compositing gesture in which a posture presented by the gesture and its movement characteristic are combined.

The user input apparatus 1 may be able to recognize a gesture, for example, "rotating the arm while gripping" in distinction from the simple gesture of "gripping". As a matter of course, it is also possible to distinctly recognize gestures depending on a way to rotate the arm (a rotation direction and a rotation speed).

Previously, the embodiments of the present invention has been described taking the user input apparatus 1 that is configured in a shape of a bracelet similar to a wrist watch as one example. However, the subject matter of the present invention is not limited to this.

For example, by alternately arranging a plurality of the transmission electrodes and a plurality of the reception electrodes along the shoe sole (FIG. 8) or the road surface, the multi-dimensional value may be measured due to the capacitive coupling of capacitors as described above. Accordingly, a user input apparatus 1 that is capable of recognizing walking movement and shifting of balance may be configured.

In addition, by alternately arranging a plurality of the transmission electrodes and a plurality of the reception electrodes along a frame of eye glasses, (FIG. 7), the multi-dimensional value may be measured due to the capacitive coupling of capacitors as described above, and the user input apparatus 1 that is capable of recognizing deformation of the face (particularly, change of facial expression made by an eyelid and a periphery of an eye) may be configured.

SUPPLEMENT

The present invention has been explained in detail with reference to the specific embodiments as above. However, it is obvious that a person skilled in the art could modify or substitute these embodiments without departing from the scope of subject matter of the present invention. In other words, the present invention is disclosed in a form of an exemplification and the present invention should not be interpreted in a limited way. In order to decide the subject matter of the present invention, the scope of claims should be considered, which is described at the front of the specification.

INDUSTRIAL APPLICABILITY

According to the present invention, it is possible to provide an excellent user input apparatus, with which a user is capable of carrying out the input operation by using a part of his or her body.

In addition, according to the present invention, it is possible to provide an excellent user input apparatus, which is used by attaching to a human body and is capable of precisely carrying out the input operation in accordance with the user's intension.

In addition, according to the present invention, it is possible to provide an excellent user input apparatus, which recognizes gestures presented by the user and may capture them therein as the user's input.

In addition, according to the present invention, it is possible to provide an excellent user input apparatus, which is complicated to be attached to the human body and is composed in a natural manner such as a wrist watch.

Since the user input apparatus according to the present invention is configured, for example, like a wrist watch, the system may recognize the gesture such as "grip" and "release" or the like and may input the gesture as a command merely by attaching the user input apparatus to user's wrist. Further, by adding a sensor (for example, an acceleration sensor) for measuring movement of the arm itself, the user input apparatus may be configured so as to input more complicated instruction and command.

The user input apparatus according to the present invention is capable of being used as an input apparatus for a wearable computer (or wearable computer), or a controller to input a command for a game machine or the like.

What is claimed is:

1. A user input apparatus that is used by attaching to a human body, the user input apparatus being characterized by comprising:
   a plurality of transmission electrodes;
   a plurality of reception electrodes;
   a human body attaching means for attaching the transmission electrodes and reception electrodes alternately along a surface of the human body;
   a signal generator for supplying a waveform signal of a predetermined frequency to each of the transmission electrodes; and
   a receiver for receiving a waveform signal to be received at each of the reception electrodes,
   wherein the user input apparatus comprises measurement means for measuring a gesture of a user with the plurality of transmission electrodes and the plurality of reception electrodes by using a change in a static capacity of a capacitor that is formed between the transmission electrode and the reception electrode and the surface of the human body, and for detecting results of the measurement as a multi-dimensional vector value,
   wherein values of respective dimensions of the multi-dimensional vector value correspond to respective pairs of the transmission electrodes and the reception electrodes, the pairs being different from each others.

2. The user input apparatus according to claim 1, the user input apparatus being characterized by further comprising:
   gesture registration means for registering a gesture to be registered and corresponding multi-dimensional vector value that is measured by the measurement means in between the respective transmission electrodes and reception electrodes; and
   gesture recognition means for recognizing a gesture by comparing and checking a multi-dimensional vector value that is newly measured by the measurement means with a multi-dimensional vector value that is already registered in the gesture registration means.

3. The user input apparatus according to claim 2, the user input apparatus further comprising sensor means for measuring a physical quantity that changes in accordance with movement of a human body,
   wherein the gesture registration means registers the gesture to be registered in association with the multi-dimensional vector value that is measured when the gesture is performed and the physical quantity; and wherein the gesture recognition means recognizes the gesture by comparing and checking the multi-dimensional vector value that is newly measured by the measurement means and the physical quantity that is measured by the sensor means in correspondence with the detected multi-dimensional vector value with the multi-dimensional vector value and the physical quantity that are already registered in the gesture registration means.

4. The user input apparatus according to claim 1, the user input apparatus being characterized that:
the human body attaching means is configured like a bracelet capable of being attached to a wrist of a user.

5. The user input apparatus according to claim 1, the user input apparatus being characterized that:
the human body attaching means is configured like a wearable shoe sole that follows a form of a foot sole of a user.

6. The user input apparatus according to claim 1, the user input apparatus being characterized that:
the human body attaching means is configured like a frame of eye glasses capable of being attached on a face of a user.

* * * * *